United States Patent
Kim et al.

(10) Patent No.: US 8,827,811 B2
(45) Date of Patent: Sep. 9, 2014

(54) MOBILE TERMINAL CAPABLE OF PROVIDING MULTIPLAYER GAME AND OPERATING METHOD OF THE MOBILE TERMINAL

(75) Inventors: Hansu Kim, Seoul (KR); Duckmoon Shin, Seoul (KR); Jungyeoul Ju, Seoul (KR); Jeonghyuk Yoon, Seoul (KR); Hyungwook Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 543 days.

(21) Appl. No.: 12/826,279

(22) Filed: Jun. 29, 2010

(65) Prior Publication Data

US 2010/0331082 A1 Dec. 30, 2010

(30) Foreign Application Priority Data

Jun. 30, 2009 (KR) .................. 10-2009-0059307
Jun. 21, 2010 (KR) .................. 10-2010-0058690

(51) Int. Cl.
*A63F 9/24* (2006.01)
*G06F 17/00* (2006.01)
*G06F 19/00* (2011.01)
*A63F 13/30* (2014.01)
*H04M 1/725* (2006.01)

(52) U.S. Cl.
CPC .............. *A63F 13/12* (2013.01); *H04M 1/7253* (2013.01); *H04M 1/72544* (2013.01); *A63F 2300/552* (2013.01); *A63F 2300/301* (2013.01)
USPC .......... 463/42; 463/4; 463/9; 463/10; 463/11; 463/31

(58) Field of Classification Search
USPC .................................. 463/4, 9–11, 13, 31, 42
See application file for complete search history.

(56) References Cited

U.S. PATENT DOCUMENTS

| | | | |
|---|---|---|---|
| 8,077,157 B2 * | 12/2011 | Sengupta et al. .............. | 345/173 |
| 2006/0058093 A1 * | 3/2006 | White et al. .................... | 463/13 |
| 2009/0117995 A1 * | 5/2009 | Lyons et al. .................... | 463/25 |
| 2010/0120536 A1 * | 5/2010 | Chatellier et al. .............. | 463/40 |
| 2010/0285881 A1 * | 11/2010 | Bilow ............................. | 463/37 |

OTHER PUBLICATIONS

"Wikipedia Pokemon Battle Revolution". From Wikipedia, The Free Encyclopedia. [online], [retrieved on Aug. 17, 2012]. Retrieved from the Internet <URL:http://en.wikipedia.org/wiki/Pokemon_Battle_Revolution>. 3 pages.*

(Continued)

*Primary Examiner* — Lawrence Galka
(74) *Attorney, Agent, or Firm* — Birch, Stewart, Kolasch & Birch, LLP

(57) ABSTRACT

A mobile terminal and an operating method of the mobile terminal are provided. The operating method includes connecting the mobile terminal to a sharing device so as to be able to communicate with the sharing device, the sharing device displaying a shared screen; downloading multiplayer game programs from the sharing device; and displaying a personal screen on a display module of the mobile terminal and running a multiplayer game together with another mobile terminal by using the personal screen and the shared screen while exchanging data with the sharing device. Therefore, it is possible for the mobile terminal to effectively run the multiplayer game together with the other mobile terminal by using the personal screen and the shared screen.

22 Claims, 16 Drawing Sheets

(56) References Cited

OTHER PUBLICATIONS

"Wikipedia Wii". From Wikipedia, The Free Encylopedia. [online], [retrieved on Aug. 17, 2012]. Retrieved from the Internet <URL:http://en.wikipedia.org/wiki/Wii>. 16 pages.*

"Pokemon Battle Revolution Manual", [dated 2007]. [retrieved Aug. 17, 2012]. Retrieved from the Internet <URL:http://www.replacementdocs.com/download.php?view.7110l>. 12 pages.*

"Pokemon Battle Revolution DS Screens", [dated 2007]. [retrieved Aug. 17, 2012]. Retrieved from the Internet <URL:http://www.replacementdocs.com/download.php?view.7110l>. 1 page.*

"Wikipedia Nintendo DS". From Wikipedia, The Free Encylopedia. [online], [retrieved on Aug. 17, 2012]. Retrieved from the Internet <URL:http://en.wikipedia.org/wiki/Nintendo_DS>. 10 pages.*

* cited by examiner

| 7 | 6 | 5 | 4 | 3 | 2 | 1 | 0 |
|---|---|---|---|---|---|---|---|
| Player NUMBER | | CARD CHARACTERISTICS | | CARD INFORMATION | | | |
| Reserved | | OPERATION Command | | Command type | | | |

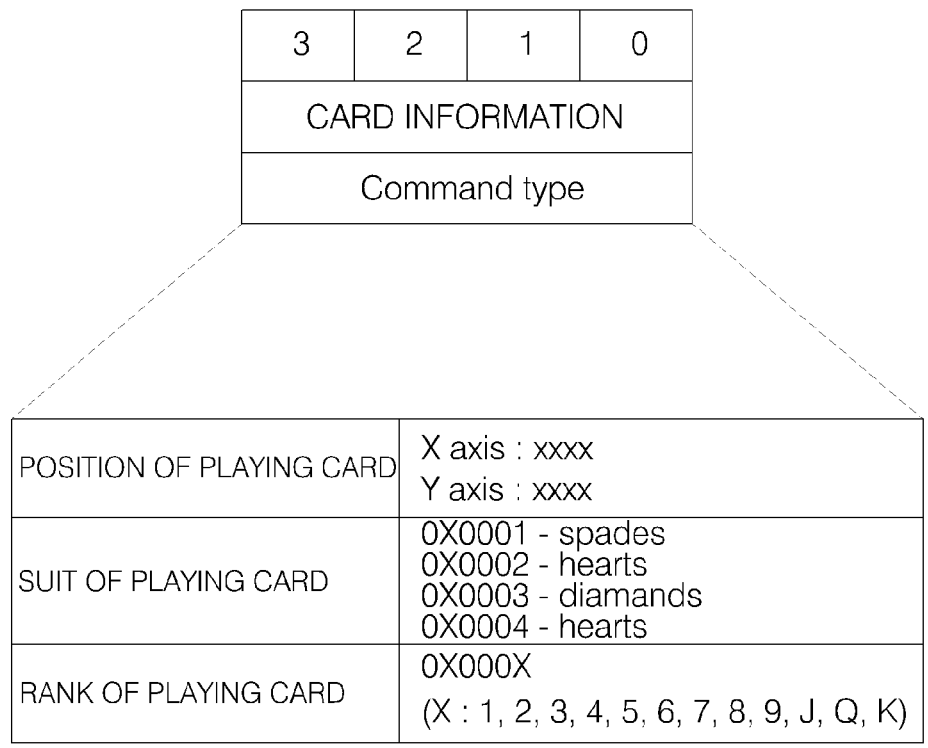

MOBILE TERMINAL CAPABLE OF PROVIDING MULTIPLAYER GAME AND OPERATING METHOD OF THE MOBILE TERMINAL

CROSS-REFERENCE TO RELATED APPLICATION

This application claims the priority benefit of Korean Patent Application Nos. 10-2009-0059307 filed on Jun. 30, 2009 and No. 10-2010-0058690 filed on Jun. 21, 2010 in the Korean Intellectual Property Office, the disclosure of which is incorporated herein by reference.

BACKGROUND OF THE INVENTION

1. Field of the Invention

The present invention relates to a mobile terminal and an operating method of the mobile terminal, and more particularly, to a mobile terminal capable of running a multiplayer game together with another mobile terminal and an operating method of the mobile terminal.

2. Description of the Related Art

Mobile terminals are portable devices capable of performing voice/video calls, inputting and outputting information, and/or storing data. As the functions of mobile terminals diversify, an increasing number of mobile terminals have been equipped with various complicated functions, such as capturing photos and moving images, playing music files and moving image files, providing games, receiving broadcast programs, and providing wireless Internet services, and have thus evolved into multifunctional multimedia players.

Various attempts have recently been made to implement a variety of complicated functions in mobile terminals such as providing a user interface (UI) environment for allowing users to search for and choose desired functions with ease. In addition, mobile terminals equipped with, for example, a double-sided liquid crystal display (LCD) or a full touch screen, have been developed.

In the meantime, various mobile games that can be played simply by touching and dragging on the touch screen of a mobile terminal, instead of manipulating keys or buttons on a mobile terminal, have become available. Thus, it is necessary to develop ways to run a multiplayer game between multiple mobile terminals with the aid of a sharing device and thus to help the users to play the multiplayer game simply by touching and dragging on their mobile terminals.

SUMMARY OF THE INVENTION

The present invention provides a mobile terminal capable of running a multiplayer game together with another mobile terminal with the use of a shared screen and an operating method of the mobile terminal.

According to an aspect of the present invention, there is provided an operating method of a mobile terminal, the operating method including connecting communicably to a sharing device, which displays a shared screen; displaying a personal screen on a display module of the mobile terminal; displaying a graphic object on the personal screen; and transmitting identification information of the graphic object to the sharing device in accordance with a user input detected from the graphic object so as to display the graphic object on the sharing device.

According to another aspect of the present invention, there is provided a mobile terminal including a wireless communication unit configured to connect communicably to a sharing device, the sharing device displaying a shared screen; a display module configured to display a personal screen; and a controller configured to display a graphic object on the personal screen and to transmit identification information of the graphic object to the sharing device in accordance with a user input detected from the graphic object so as to display the graphic object on the sharing device.

According to another aspect of the present invention, there is provided an operating method of a mobile terminal, the operating method including connecting the mobile terminal to a sharing device and another mobile terminal so as to be able to communicate with the sharing device and the other mobile terminal, the sharing device displaying a shared screen; exchanging multiplayer game programs with the other mobile terminal and displaying a shared screen on the sharing device; and displaying a personal screen on a display module of the mobile terminal and running a multiplayer game together with the other mobile terminal by using the personal screen and the shared screen while exchanging data with the other mobile terminal.

According to another aspect of the present invention, there is provided a mobile terminal including a wireless communication unit configured to connect the mobile terminal to a sharing device and another mobile terminal so as to be able to communicate with the sharing device and the other mobile terminal, the sharing device displaying a shared screen; a display module configured to display a personal screen; and a controller configured to display a shared screen on the sharing device and run a multiplayer game together with the other mobile terminal by using the personal screen and the shared screen while exchanging data with the other mobile terminal.

According to another aspect of the present invention, there is provided an operating method of a mobile terminal, the operating method including connecting the mobile terminal to another mobile terminal so as to be able to communicate with the other mobile terminal; exchanging multiplayer game programs with the other mobile terminal and projecting a shared screen with the use of a projector; and displaying a personal screen on a display module of the mobile terminal and running a multiplayer game together with the other mobile terminal by using the personal screen and the shared screen while exchanging data with the other mobile terminal.

According to another aspect of the present invention, there is provided a mobile terminal including a wireless communication unit configured to connect the mobile terminal to another mobile terminal so as to be able to communicate with the other mobile terminal; a display module configured to display a personal screen; a projector configured to project a shared screen; and a controller configured to run a multiplayer game together with the other mobile terminal by using the personal screen and the shared screen while exchanging data with the other mobile terminal.

BRIEF DESCRIPTION OF THE DRAWINGS

The above and other features and advantages of the present invention will become more apparent by describing in detail preferred embodiments thereof with reference to the attached drawings in which:

FIGS. 16 through 19 illustrate diagrams of various data structures that can be used in a multiplayer card game run by a plurality of mobile terminals.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer or an e-book device. In this disclosure, the terms 'module' and 'unit' can be used interchangeably.

Figure 1:
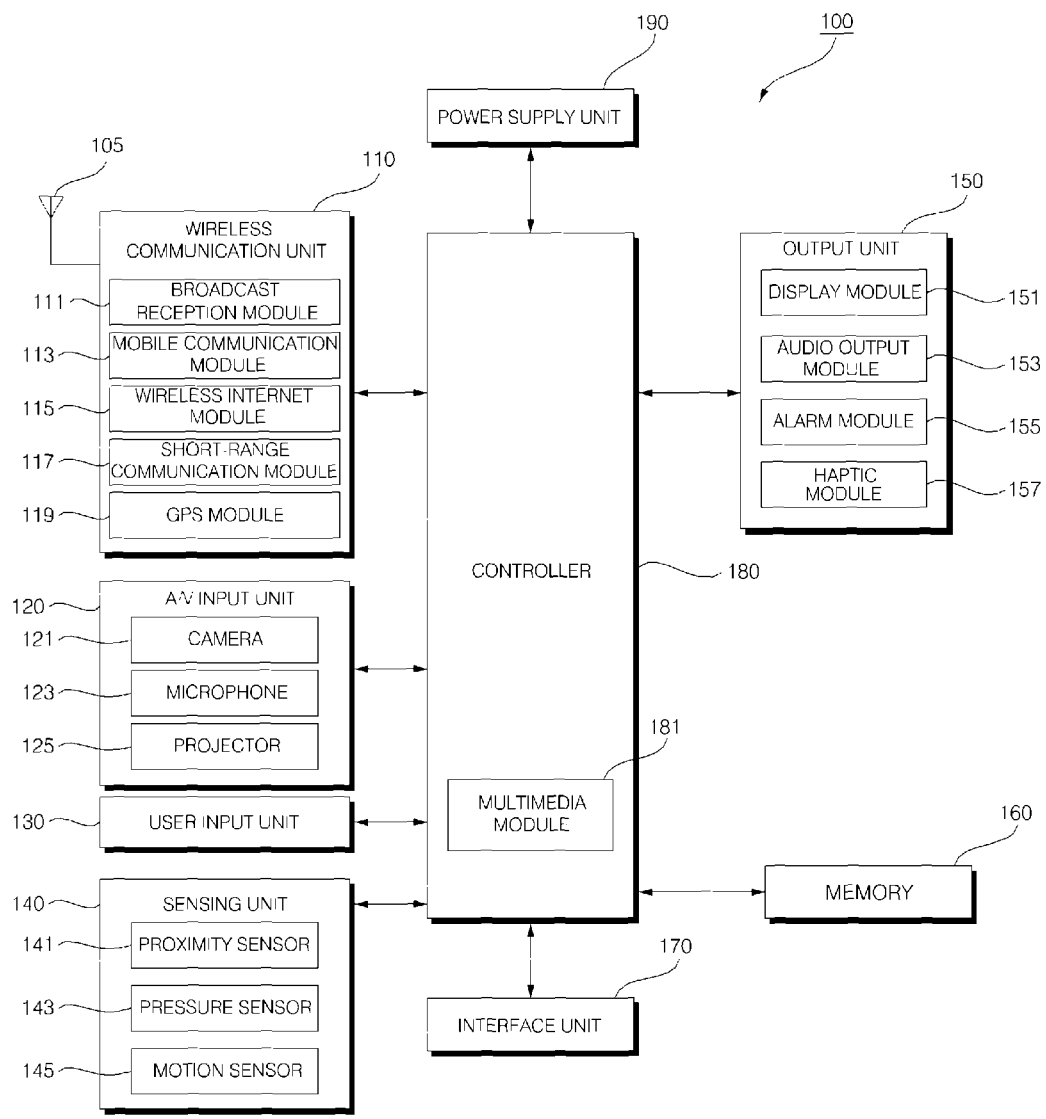
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input/output (I/O) unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may come in the form of digital multimedia broadcasting (DMB) electronic program guide (EPG) or digital video broadcasting-handheld (DVB-H) electronic service guide (ESG).

The broadcast reception module 111 may receive broadcast signals using various broadcasting systems, such as DMB-terrestrial (DMB-T), DMB-satellite (DMB-S), media forward link only (MediaFLO), DVB-H, and integrated services digital broadcast-terrestrial (ISDB-T). In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V I/O unit 120 may be used to receive audio signals or video signals. The A/V I/O unit 120 may include a camera 121, a microphone 123 and a projector 125. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The projector 125 may project an image in an image display region, which is a predetermined distance apart from the main body of the mobile terminal 100, by irradiating a beam of light. The projector 125 may be a liquid crystal display (LCD) projector or a laser projector.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the position of the mobile terminal 100 and whether the mobile terminal 100 is placed in contact with a user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may detect an approaching object or whether there is an object nearby the mobile terminal 100 without mechanical contact. More specifically, the proximity sensor 141 may detect an approaching object based on a change in an alternating current (AC) magnetic field or a static magnetic field, or the rate of change of capacitance. The sensing unit 140 may include two or more proximity sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of an LCD, a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a slider-type mobile terminal. Rather, the present invention can be applied to various mobile phones, other than a slider-type mobile terminal.

Figure 2:
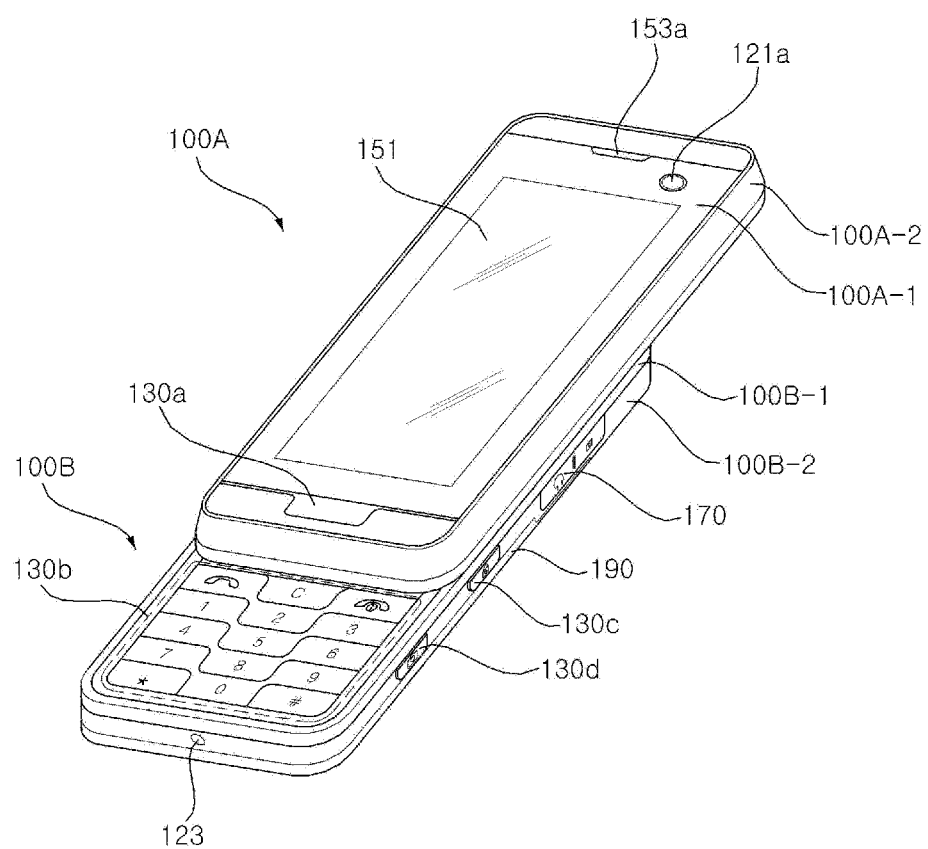
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first audio output module 153a, a first camera 121a and a first user input module 130a may be disposed in the front case 100A-1.

Examples of the display module 151 include an LCD and an OLED which can visualize information. Since a touch pad is configured to overlap the display module 151 and thus to form a mutual layer structure, the display module 151 may serve as a touch screen. Thus, the user can enter various information simply by touching the display module 151.

The exterior of the second body 100B may be defined by a second front case 100B-1 and a second rear case 100B-2. A second user input module 130b may be disposed in the second body 100B, and particularly, at the front of the second front case 100B-1. Third and fourth user input modules 130c and 130d, the microphone 123 and the interface unit 170 may be provided in the second front case 100B-1 or the second rear case 100B-2.

The first through fourth user input modules 130a through 130d may be collectively referred to as the user input unit 130. The user input unit 130 may adopt various manipulation methods as long as it can offer tactile feedback to the user.

The first user input module 130a may allow the user to enter various commands such as 'start', 'end', and 'scroll' to the mobile terminal 100, the second user input module 130b may be used to enter various numerals, characters or symbols, and the third and fourth user input modules 130c and 130d may be used as hot keys for activating certain functions of the mobile terminal 100.

The microphone 123 may be configured to properly receive the user's voice or other sounds.

The interface unit 170 may serve as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

Figure 3:
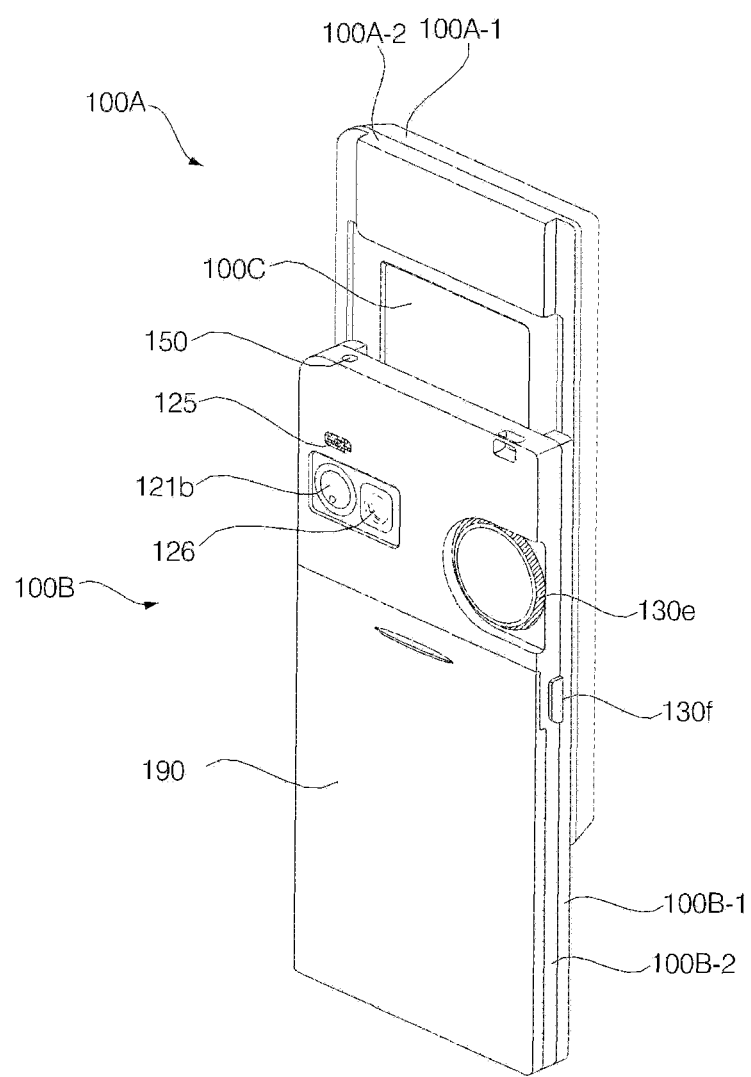
FIG. 3 illustrates a rear perspective view of the mobile terminal shown in FIG. 2.

FIG. 3 illustrates a rear perspective view of the mobile terminal 100 shown in FIG. 2. Referring to FIG. 3, a fifth user input module 130e, which is of a wheel type, and the second camera 121b may be disposed at the rear of the second rear case 100B-2 of the second body 100B, and a sixth user input module 130f may be disposed on one side of the second body 100B.

The second camera 121b may have a different photographing direction from the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. Since images captured by the second camera 121b generally do not need to be transmitted, a high-resolution camera may be used as the second camera 121b.

A camera flash 125 and a mirror 126 may be disposed near the second camera 121b. The camera flash 125 may be used to illuminate a subject when the user attempts to capture an image of the subject with the second camera 121b. The mirror 126 may be used for the user to prepare himself or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for receiving a broadcast signal may be disposed on one side of the second rear case 100B-2. The antenna may be installed so as to be able to be retracted from the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden by the second front case 100B-1 of the second body 100B, and thus may not be exposed.

The second camera 121b and the other elements that have been described as being provided in the rear case 100A-2 may be provided in the front case 100A-1. In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

Figure 4:
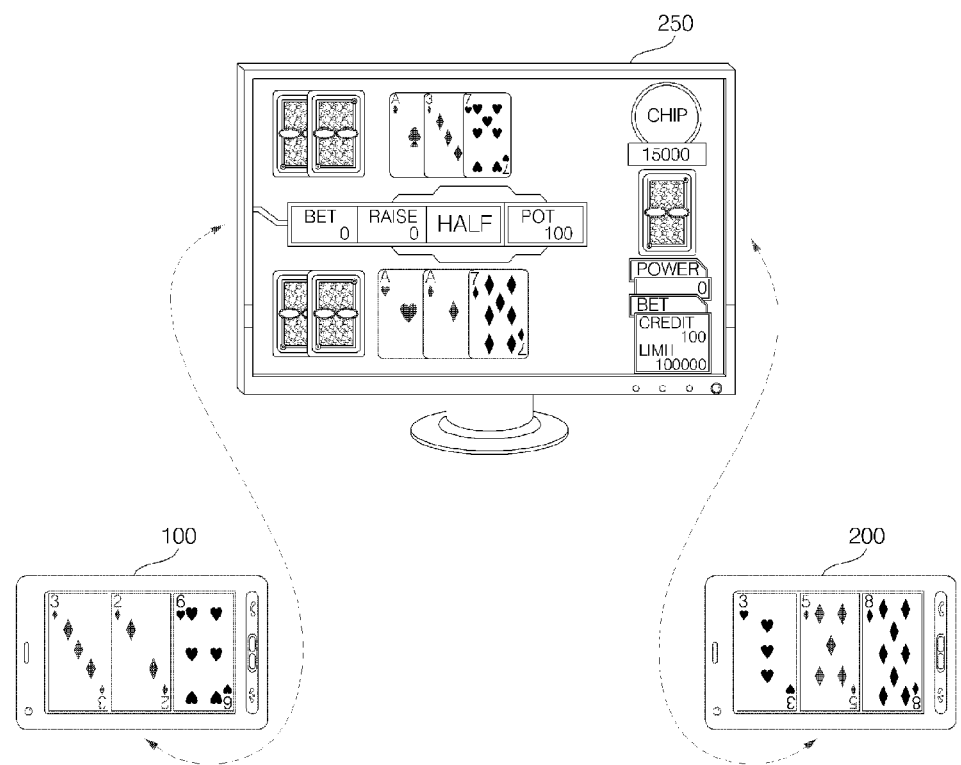
FIGS. 4 through 8 illustrate diagrams for explaining an operating method of a mobile terminal according to an exemplary embodiment of the present invention.

FIGS. 4 through 8 illustrate diagrams for explaining an operating method of a mobile terminal according to an exemplary embodiment of the present invention. Referring to FIG. 4, the mobile terminal 100 (hereinafter referred to as the first mobile terminal 100) and a second mobile terminal 200 may be connected to a sharing device 250 so as to be able to communicate with the sharing device 250. The sharing device 250 may be a host. A TV or PC may be used as the sharing device 250.

A main program for providing a multiplayer game may be installed in the sharing device 250, and a simple game controller program may be installed in the first and second mobile terminals 100 and 200, respectively. In this manner, it is possible to maximize the use of the storage capacity of the mobile terminals 100 and 200.

The processing of application data for running a multiplayer game may be mainly performed by the sharing device 250. The first and second mobile terminals 100 and 200 may display data provided by the sharing device 250, and may run a multiplayer game by exchanging data with the sharing device 250 in accordance with a user command.

During a multiplayer game, a personal screen, which shows how to play the multiplayer game and how the multiplayer game progresses, may be displayed on each of the screens of the first and second mobile terminals 100 and 200, and a shared screen may be displayed on the sharing device 250.

Accordingly, the users of the first and second mobile terminals 100 and 200 can play a multiplayer game by appropriately touching and dragging on the screens of the first and second mobile terminals 100 or moving the first and second mobile terminals 100 and 200 while watching the personal screen from the first and second mobile terminals 100 and the shared screen from the sharing device 250.

For example, during a multiplayer card game, if the user of the first mobile terminal 100 drags a playing card out of the display module 151 of the first mobile terminal 100, the playing card may appear on the shared screen of the sharing device 250. Alternatively, if the user of the first mobile terminal 100 moves the first mobile terminal 100 while touching on a playing card, the playing card may appear on the shared screen of the sharing device 250.

During a dice game, if the user of the first mobile terminal 100 shakes the first mobile terminal 100 slightly, an image of a dice roll may be displayed on the display module 151 of the first mobile terminal 100. On the other hand, if the user of the first mobile terminal 100 shakes the first mobile terminal 100 hard, a dice may be displayed on the shared screen of the sharing device 250. The operation of the second mobile terminal 200 is basically the same as the operation of the first mobile terminal 100.

Figure 5:
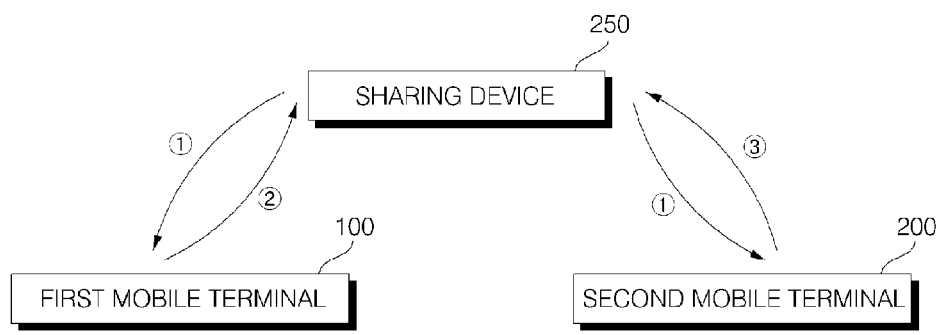

FIG. 5 illustrates the flow of data between the sharing device 250 and the first and second mobile terminals 100 and 200 during a card game when the sharing device 250 serves as a host, as shown in FIG. 4. Referring to FIG. 5, the sharing device 250 may transmit an 'initiate game' command and card information (such as the position and the suit and rank of each playing card initially held by each of the users of the first and second mobile terminals 100 and 200) to the first and second mobile terminals 100 and 200. As the card game progresses, the sharing device 250 may update the card information, and may transmit the updated card information to the first and second mobile terminals 100 and 200. If the outcome of the card game is decided or a predefined event occurs, the sharing device 250 may transmit an event occurrence command (such as a haptic command) to the first and second mobile terminals 100 and 200, as indicated by reference numeral ①.

The first and second mobile terminals 100 and 200 may transmit information regarding card selections and arrangements made by their users during the card game to the sharing device 250, and may also transmit player number information for withdrawing playing cards from the shared screen and a 'request card' command to the sharing device 250, as indicated by reference numeral ②.

The second mobile terminal 200 may transmit the same data as that transmitted to the first mobile terminal 100 to the sharing device 250, as indicated by reference numeral ③.

During a multiplayer game, various graphic objects such as playing cards may be displayed on a personal screen of the first mobile terminal 100. If one of the graphic objects is selected in response to a gesture input, the first mobile terminal 100 may transmit identification information of the selected graphic object to the sharing device 200, and may allow the sharing device 200 to display the selected graphic object thereon. The gesture input may include a touch input, a touch-and-drag input, a flicking input and a movement of the main body of the mobile terminal 100.

The identification information of the selected graphic object may include characteristics information. When displaying the selected graphic object on the sharing device 200, the shape of the selected graphic object may be changed or a screen effect or a haptic effect may be generated in accordance with the characteristics information. Once the selected graphic object is displayed on the sharing device 200, it may be deleted from the first mobile terminal 100.

Figure 6:
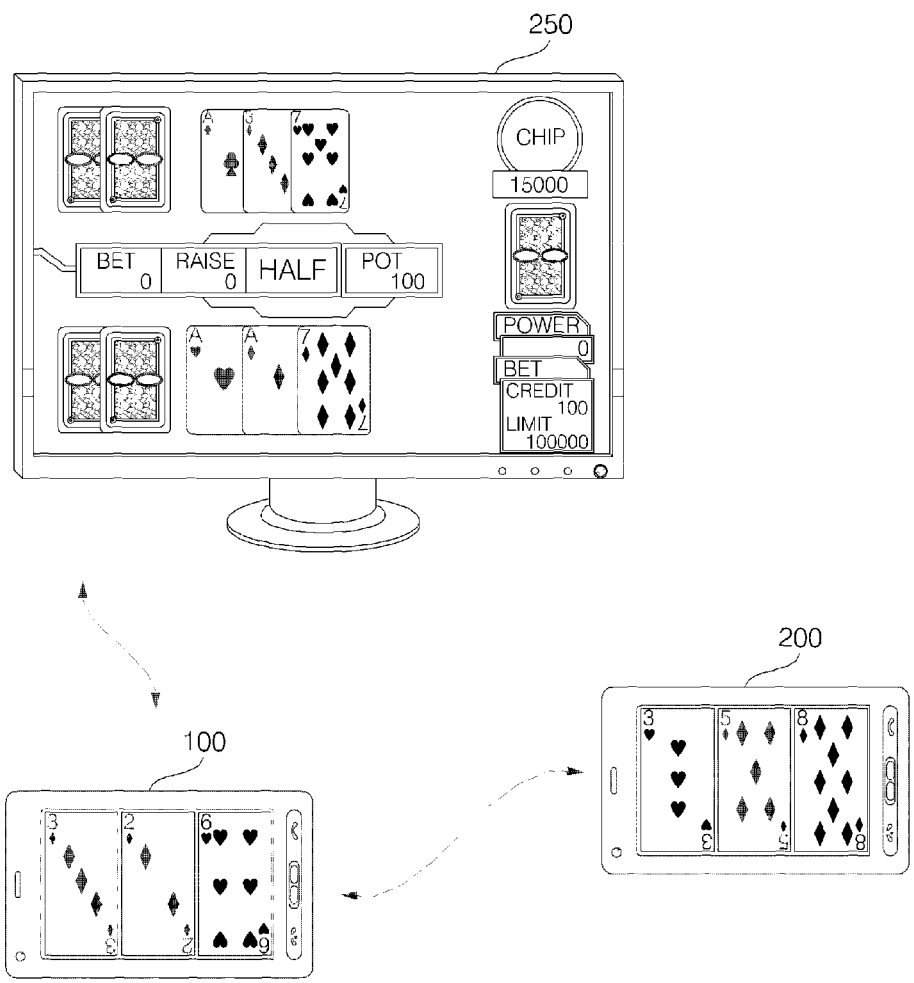

FIG. 6 illustrates a case where the first mobile terminal 100 serves as a host. Referring to FIG. 6, the first and second mobile terminals 100 and 200 may be connected to the sharing device 250 so as to be able to communicate with the sharing device 250. The second mobile terminal 200 may be connected to the first mobile terminal 100 so as to be able to communicate with the first mobile terminal 100. The sharing device 250 may be a TV or PC.

A main program for providing a multiplayer game may be installed in the first mobile terminal 100, and a game controller program may be installed in the second mobile terminal 200. A program for displaying a shared screen may be installed in the sharing device 250. Alternatively, no additional program may be installed in the sharing device 250. In this case, the sharing device 250 may simply display a shared screen under the control of the first mobile terminal 100.

The first mobile terminal 100 may transmit shared data to be displayed on the shared screen to the sharing device 250. The sharing device 250 may process the shared data and may display the processed data on the shared screen. The second mobile terminal 100 may receive the shared data or exclusive data therefor from the first mobile terminal 100, and may display the received data on its screen.

Accordingly, the users of the first and second mobile terminals 100 and 200 can play a multiplayer game by appropriately touching and dragging on the screens of the first and second mobile terminals 100 or moving the first and second mobile terminals 100 and 200 while watching a personal screen from the first and second mobile terminals 100 and the shared screen from the sharing device 250.

Figure 7:
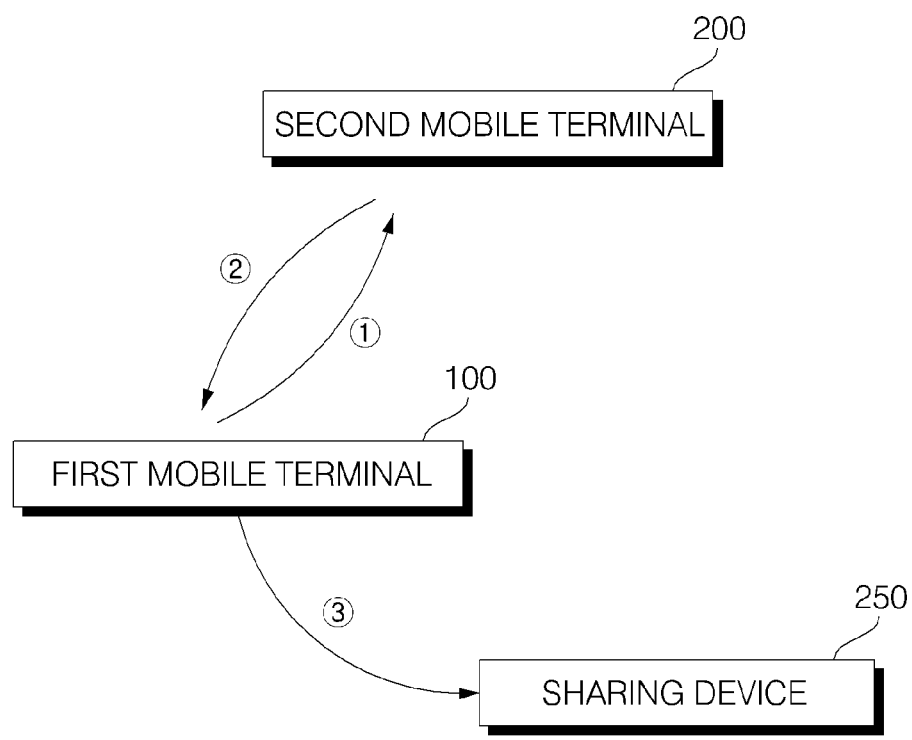

FIG. 7 illustrates the flow of data between the first mobile terminal 100, the sharing device 250 and the second mobile terminal 200 during a card game when the first mobile terminal 100 serves as a host, as shown in FIG. 6.

Referring to FIG. 7, the first mobile device 100 may transmit an 'initiate game' command and card information (such as the position and the suit and rank of each playing card initially held by the user of the second mobile terminal 200) to the second mobile terminal 200. As the card game progresses, the first mobile device 100 may update the card information, and may transmit the updated card information to the second mobile terminal 200. If the outcome of the card game is decided or a predefined event occurs, the first mobile device 100 may transmit an event occurrence command (such as a haptic command) to the second mobile device 200, as indicated by reference numeral ①.

The second mobile terminal 200 may transmit information regarding card selections and arrangements made on the shared screen to the first mobile terminal 100, and may also transmit player number information for withdrawing playing cards from the shared screen and a 'request card' command to the first mobile terminal 100, as indicated by reference numeral ②.

The first mobile terminal 100 may transmit the same data as that transmitted to the second mobile terminal 200 to the sharing device 250, as indicated by reference numeral ③.

Figure 8:
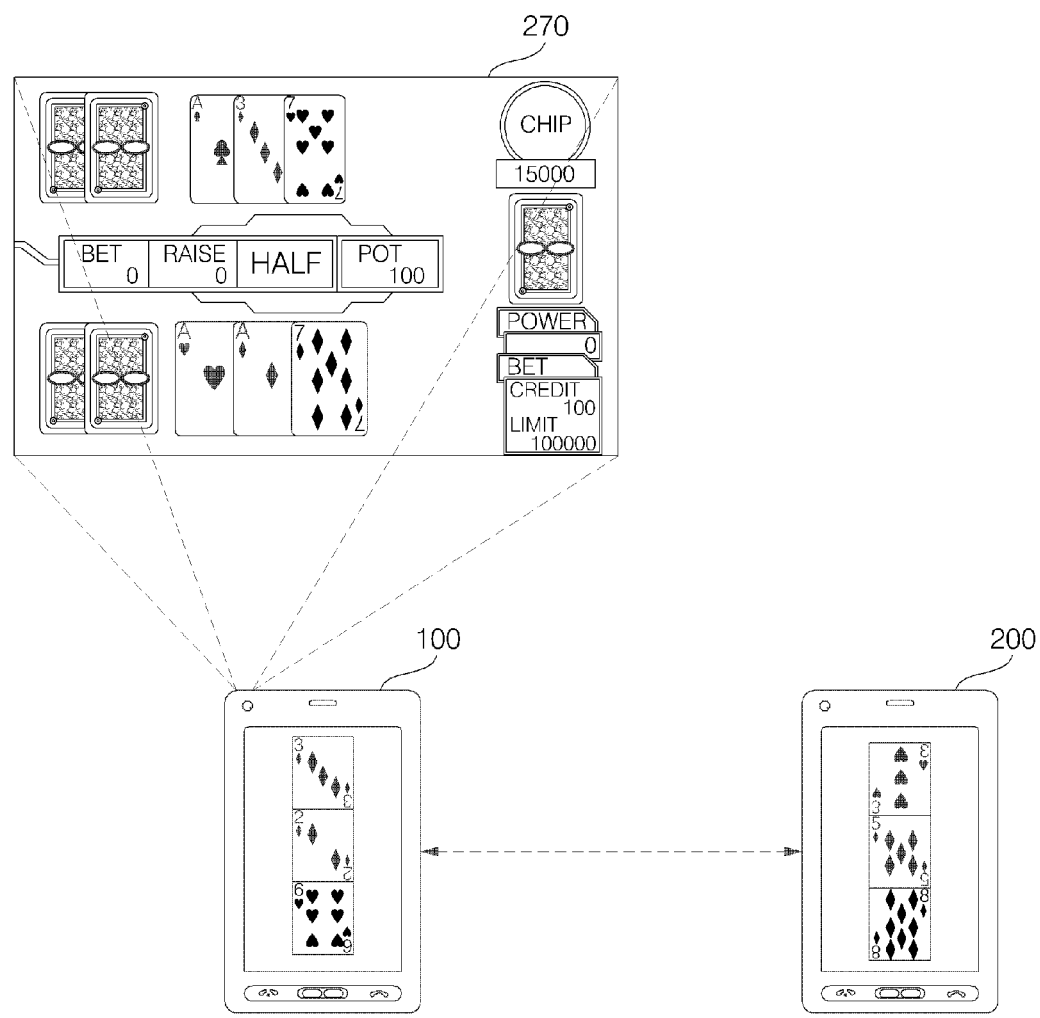

FIG. 8 illustrates a diagram for explaining how to display a shared screen 270 using a projector. Referring to FIG. 8, the first and second mobile terminals 100 and 200 may be connected so as to be able to communicate with each other, and the shared screen 270 may be projected by the projector 125 of the first mobile terminal 100.

In this manner, the users of the first and second mobile terminals 100 and 200 can play a multiplayer game by appropriately touching and dragging on the screens of the first and second mobile terminals 100 or moving the first and second mobile terminals 100 and 200 while watching the shared screen 270.

Figure 9:
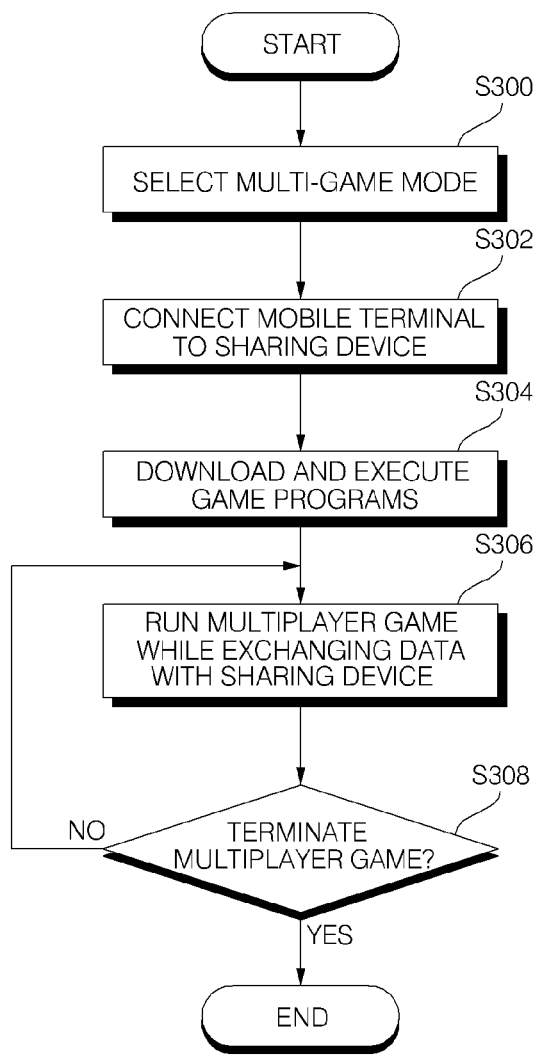
FIG. 9 illustrates a flowchart of an operating method of a mobile terminal according to another exemplary embodiment of the present invention.

FIG. 9 illustrates a flowchart of an operating method of a mobile terminal according to another exemplary embodiment of the present invention. Referring to FIG. 9, a multi-game mode may be selected in accordance with, for example, a user command (S300). The multi-game mode may be a mode for allowing the user of the first mobile terminal 100 to play a multiplayer game with the user of the second mobile terminal 200 with the use of a shared screen. During the multi-game mode, a personal screen that can be manipulated individually may be displayed on each of the screens of the first and second mobile terminals 100 and 200, and a shared screen may be displayed on the sharing device 250.

Once the multi-game mode is selected, the controller 180 may control the first mobile terminal 100 to be connected to the sharing device 250 via the wireless communication unit 110 so as to be able to communicate with the sharing device 250 (S302). In this case, the first mobile terminal 100 may be connected to the sharing device 250 using Bluetooth or WiFi.

Once the first mobile terminal 100 is connected to the sharing device 250 so as to be able to communicate with the sharing device 250, the controller 180 may download programs for running a multiplayer game from the sharing device 250 and may run the downloaded programs (S304). In this case, a main program for running a multiplayer game may be installed in the sharing device 250, and a sub-program such as a program for displaying a personal screen regarding the multiplayer game may be installed in the first and second mobile terminals 100 and 200, respectively.

Thereafter, a personal screen may be displayed on the display module 151, and the controller 180 may run a multiplayer game while exchanging data with the sharing device 250 (S306). During the multiplayer game, if the transmission of image data is required, a code corresponding to the image data may be transmitted, instead of the image data itself, thereby reducing network traffic. In addition, during the multiplayer game, the sharing device 250 may transmit a haptic code to each of the first and second mobile terminals 100 and 200 and may thus control each of the first and second mobile terminals 100 and 200 to generate a haptic effect corresponding to the haptic code.

If a communication event occurs during the multiplayer game, information indicating the occurrence of the communication event may be displayed on the display module 151.

Operation S306 may be performed until the user of the first mobile terminal 100 chooses to terminate the multiplayer game (S308).

According to this exemplary embodiment, it is possible to run a multiplayer game using a sharing device capable of providing a shared screen, which is larger than the screen of a mobile terminal.

Figure 10:
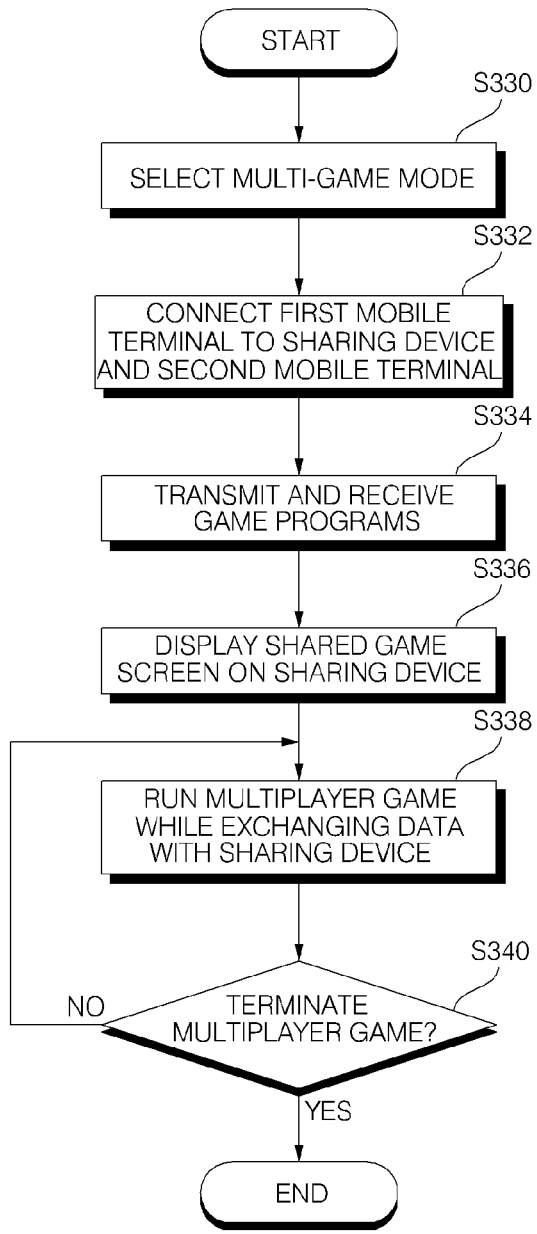
FIG. 10 illustrates a flowchart of an operating method of a mobile terminal according to another exemplary embodiment of the present invention.

FIG. 10 illustrates a flowchart of an operating method of a mobile terminal according to another exemplary embodiment of the present invention. In this exemplary embodiment, unlike in the exemplary embodiment of FIG. 9, the first mobile terminal 100 may serve as a host.

Referring to FIG. 10, if a multi-game mode is selected in accordance with, for example, a user command (S330), the controller 180 may control the first mobile terminal 100 to be connected to the second mobile terminal 200 and the sharing device 250 via the wireless communication unit 110 so as to be able to communicate with the sharing device 250 (S332).

Thereafter, the controller 180 may exchange programs for running a multiplayer game with the second mobile terminal 200 and the sharing device 250 (S334). Thereafter, the controller 180 may transmit data for displaying a shared screen to the sharing device 250 and may control the sharing device 250 to display a shared screen (S336).

Thereafter, the controller 180 may run a multiplayer game while exchanging data with the second mobile terminal 200 and the sharing device 250 (S338).

Operation S338 may be performed until the user of the first mobile terminal 100 chooses to terminate the multiplayer game (S340).

According to this exemplary embodiment, it is possible for a mobile terminal to run a multiplayer game, as a host, together with another mobile terminal.

Figure 11:
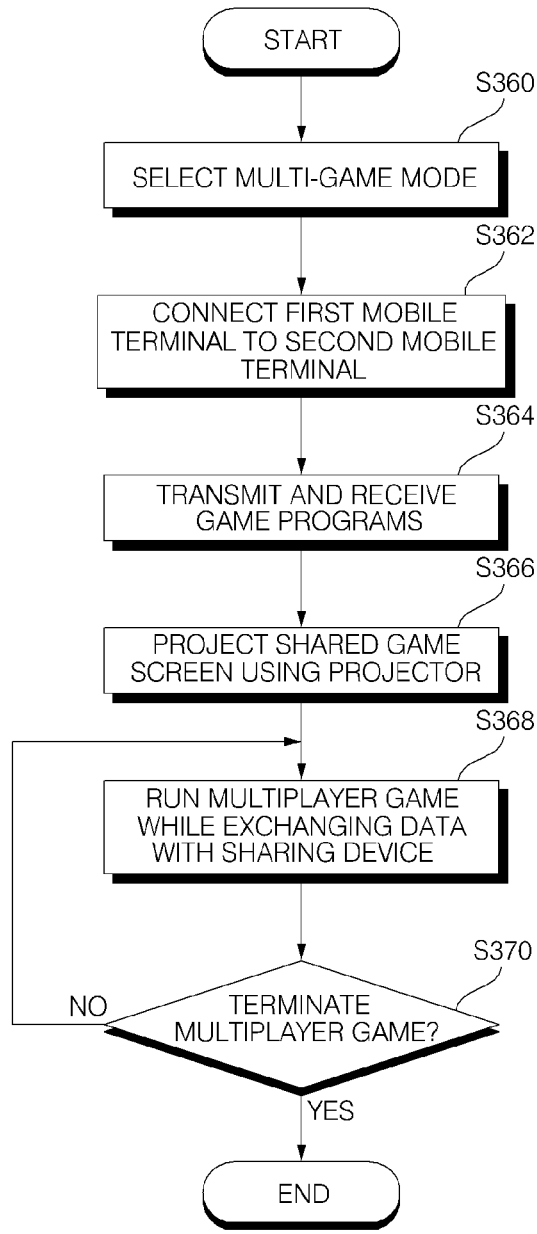
FIG. 11 illustrates a flowchart of an operating method of a mobile terminal according to another exemplary embodiment of the present invention.

FIG. 11 illustrates a flowchart of an operating method of a mobile terminal according to another exemplary embodiment of the present invention. In this exemplary embodiment, unlike in the exemplary embodiments of FIGS. 9 and 10, no sharing device may be required. Instead, a shared screen may be projected by the projector 125.

Referring to FIG. 11, operations S350 through S360 are the same as or at least similar to their respective counterparts of FIG. 10, and thus, detailed descriptions thereof will be omitted.

The controller 180 may control the projector 125 to project a shared screen (S368). Thereafter, the controller 180 may run a multiplayer game while exchanging data with the second mobile terminal 200 (S368). Operation S368 may be performed until the user of the first mobile terminal 100 chooses to terminate the multiplayer game (S370).

According to this exemplary embodiment, it is possible for a mobile terminal to run a multiplayer game together with another mobile terminal with the use of a shared screen, which is projected by a projector.

Figure 12:
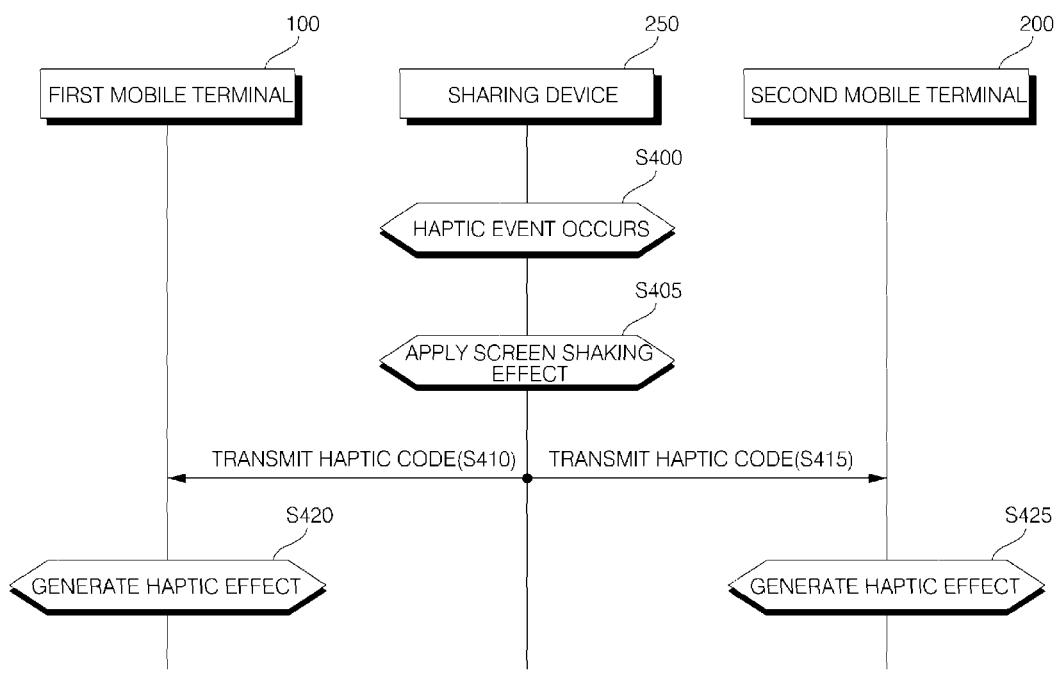
FIG. 12 illustrates a signal flow diagram for explaining how to generate a haptic effect during a multiplayer game.

FIG. 12 illustrates a signal flow diagram for explaining how to generate a haptic effect during a multiplayer game. Referring to FIG. 12, if a predefined haptic effect occurs in the sharing device 250 in which a main program for running a multiplayer game is installed (S400), the sharing device 250 may apply a screen shaking effect to a shared screen (S405). Thereafter, the sharing device 250 may transmit a haptic code to the first and second mobile terminals 100 and 200 (S410 and S415). Then, each of the first and second mobile terminals 100 and 200 may generate a haptic effect (such as vibration) corresponding to the haptic code transmitted by the sharing device 250 (S420 and S425).

In this manner, it is possible to easily generate various haptic effects such as vibration. In addition, it is possible to generate various screen effects or other effects that may be needed during the course of a multiplayer game.

Figure 13:
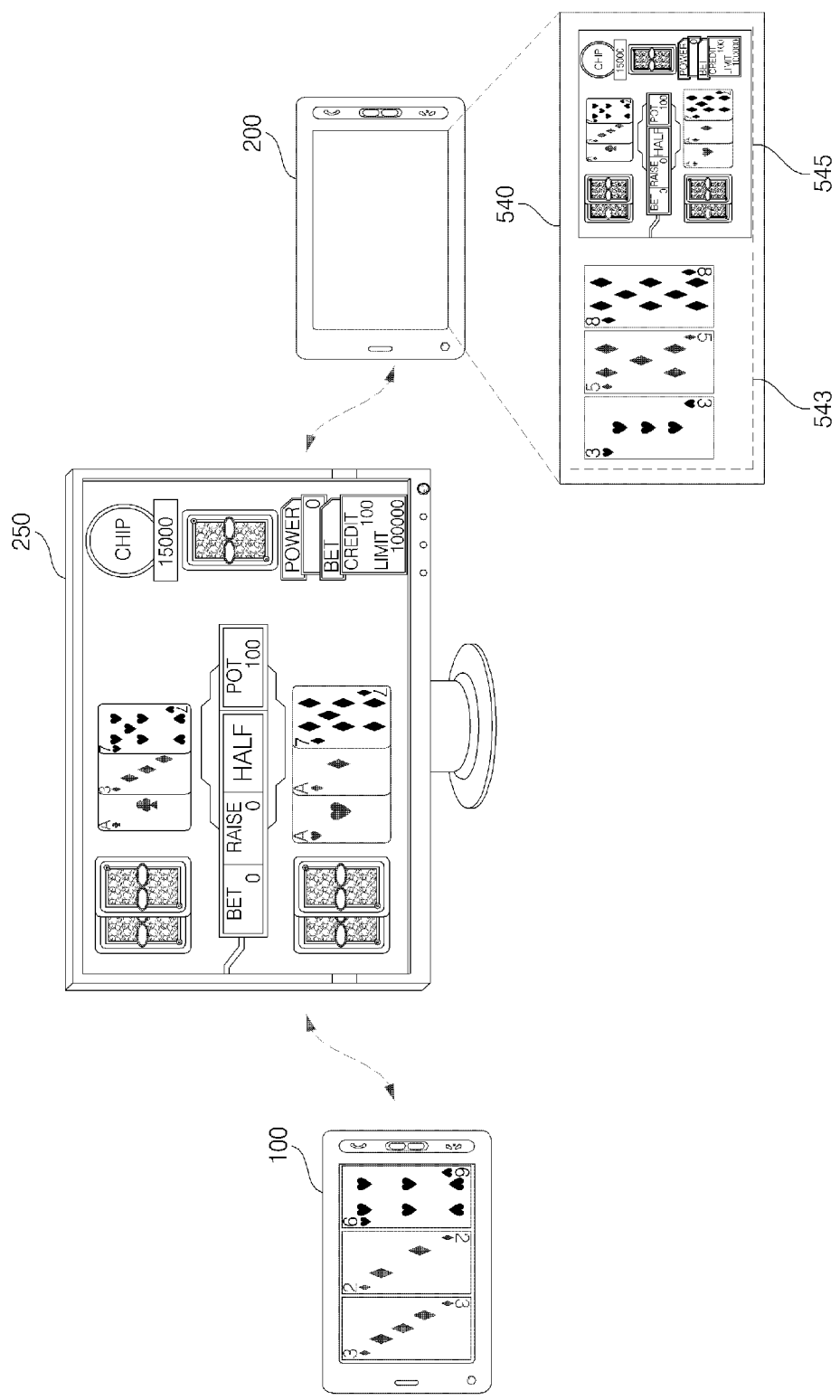
FIG. 13 illustrates a diagram for explaining how to display both a personal screen and a shared screen at the same time.

FIG. 13 illustrates a diagram for explaining how to display both a personal screen and a shared screen at the same time. Referring to FIG. 13, if a predetermined button key on the second mobile terminal 200 is pressed and thus a request for a shared screen is issued, predetermined data may be provided to the second mobile terminal 200 by the sharing device 250. As a result, a personal screen 543 and a shared screen 545 may both be displayed on a screen 540 of the second mobile terminal 200. As a result, not only the game players but also the audiences can easily determine the progress of the multiplayer game.

In short, it is possible to effectively run a multiplayer game using both a shared screen and a personal screen.

Figure 14:
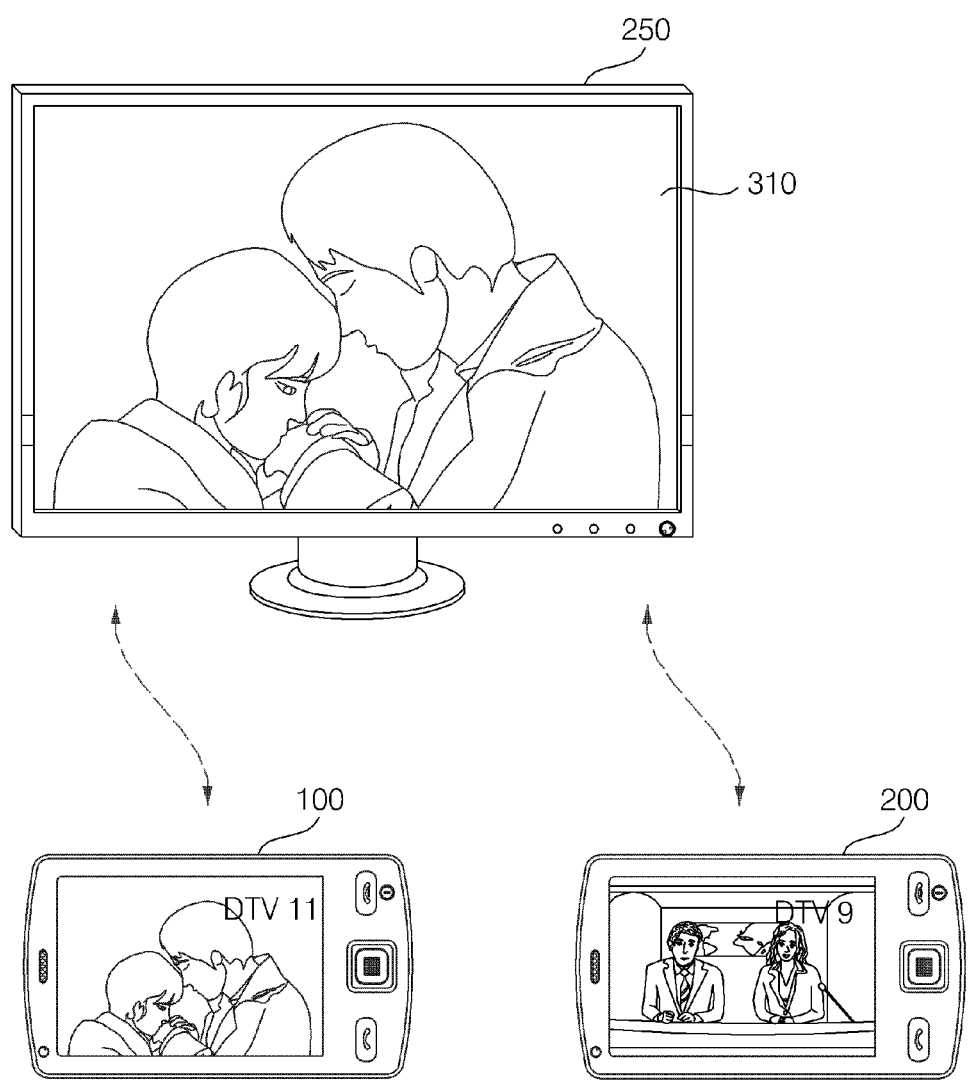
FIG. 14 illustrates a diagram for explaining how to perform an operation during a multiplayer game.

FIG. 14 illustrates a diagram for explaining how to perform an operation during a multiplayer game. Referring to FIG. 14, the sharing device 250 may display a display screen 310, which shows data that can be played or a broadcast program received from a predetermined channel, thereon upon the request of the first or second mobile terminal 100 or 200. That is, the first or second mobile terminal 100 or 200 may serve the functions of a remote control for controlling the sharing device 250.

In this case, the sharing device 250 may identify whether the first or second mobile terminal 100 or 200 is being used as a remote control, and may then perform a predefined operation. The operation performed by the sharing device 250 when the first or second mobile terminal 100 or 200 is used as a remote control may be different from the operation performed by the sharing device 250 when a typical remote control is used.

For example, if a control command is received from a typical remote control, the sharing device 250 may overlay channel information on the display screen 310. On the other hand, when the first or second mobile terminal 100 or 200 is used as a remote control, the sharing device 250 may transmit the channel information to the first or second mobile terminal 100 or 200, instead of displaying the channel information on the display screen 310, and may thus allow the channel information to be displayed on the first or second mobile terminal 100 or 200. A display screen different from a display screen currently being displayed on the sharing device 250, i.e., the display screen 310, may be displayed on the first or second display screen 100 or 200. In this case, a control command using a different code or identification signal from a typical control command may be transmitted from the first or second mobile terminal 100 or 200 to the sharing device 250. Thus, the control command transmitted from the first or second mobile terminal 100 or 200 to the sharing device 250 can be easily distinguished from a typical control command.

Figure 15:
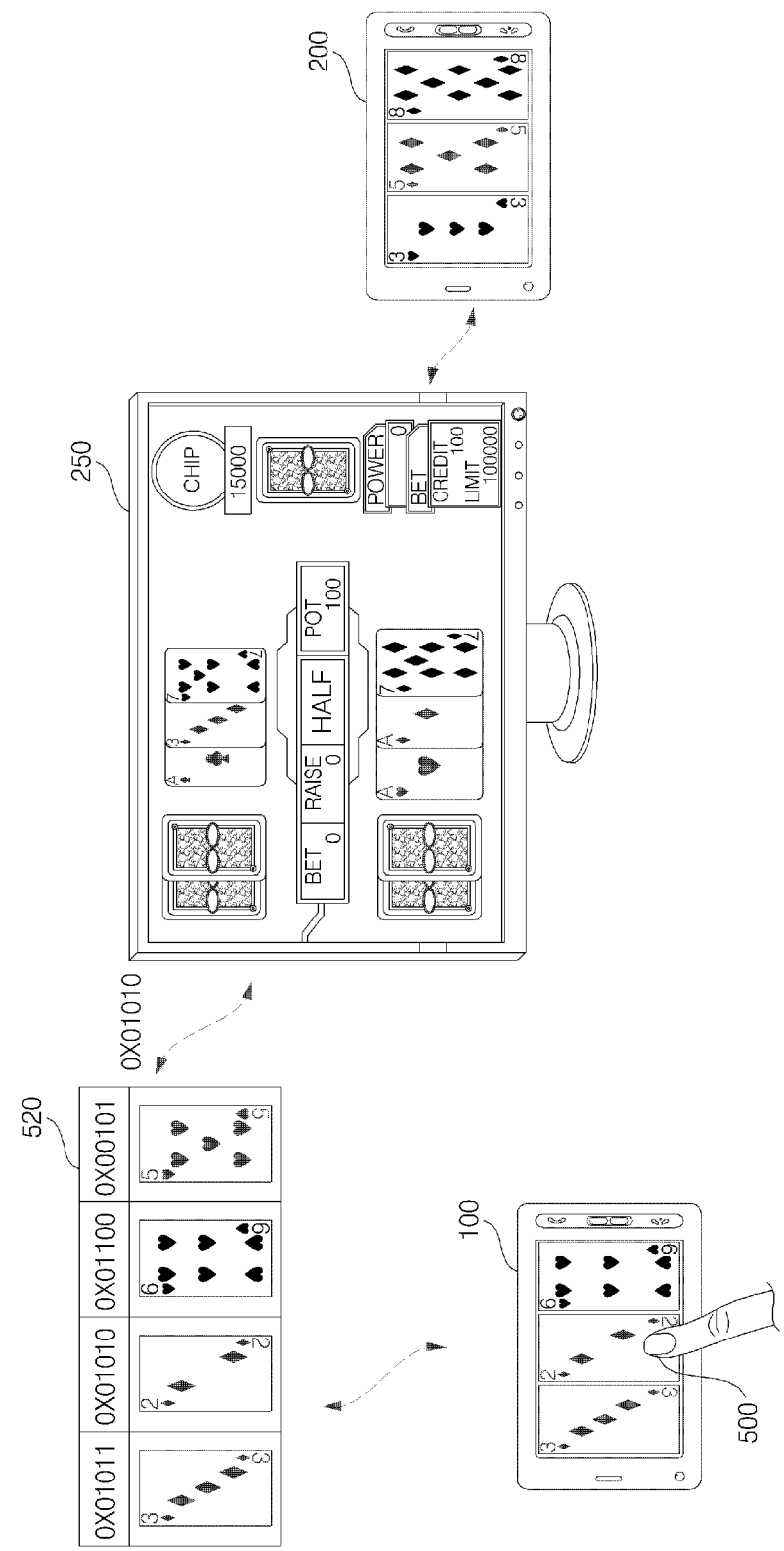
FIG. 15 illustrates a diagram for explaining how to run a multiplayer game in accordance with a predefined code.

FIG. 15 illustrates a diagram for explaining how to run a multiplayer game in accordance with a predefined code. Referring to FIG. 15, a predefined code may be transmitted between the first and second mobile terminals 100 and 200 and the sharing device 250, and thus, the first and second mobile terminals 100 and 200 can run a multiplayer game together. For example, if the 2 of diamonds playing card is selected from a display screen displayed on the first mobile terminal 100 in response to a touch input 500, the first mobile terminal 100 may search for a code corresponding to the 2 of diamonds playing card from a code conversion table 520 present in the memory 160 and may transmit the identified code (i.e., '0x01010') to the sharing device 250.

Therefore, it is possible to reduce network traffic by transmitting a code corresponding to a playing card selected by a player, instead of the selected playing card itself.

FIGS. 16 through 19 illustrate diagrams of various data structures that can be used in a multiplayer card game run by the first and second mobile terminals 100 and 200.

Figures 16, 17:
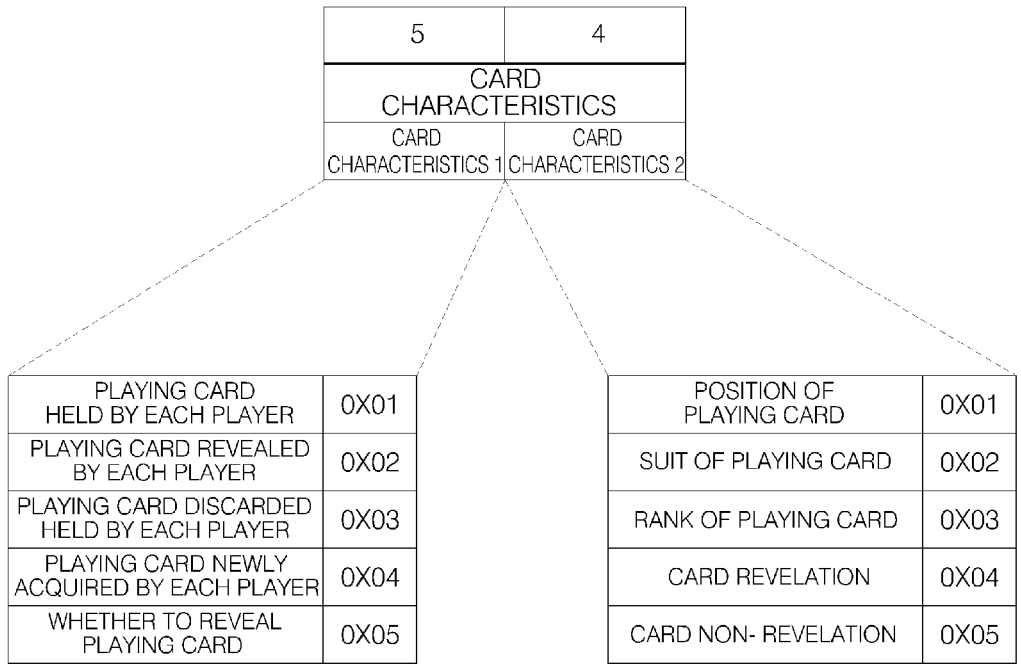

Referring to FIG. 16, data transmitted between the first and second mobile terminals 100 and 200 and the sharing device 250 during a multiplayer card game may include player number information, card characteristics information, card information, operation command information and command type information.

More specifically, referring to FIG. 16, the player number information may specify a mobile terminal to transmit or receive predefined data. The operation command information may include code corresponding to a command currently being issued.

Referring to FIG. 17, the card characteristics information may be classified into first card characteristics information such as information specifying playing cards held by each player, playing cards revealed by each player, playing cards discarded by each player, and/or playing cards newly acquired by each player and information indicating whether to reveal playing cards or second card characteristics information such as information regarding the position and the suit and rank of each playing card, and whether each playing card has been revealed or not.

Referring to FIG. 18, the card information may include the position, suit and rank of each playing card.

Referring to FIG. 19, the command type information may include 'haptic effect' information, 'backlight effect' information, 'drag effect' information and 'other effects' information.

By using the data structures shown in FIGS. 16 through 19, it is possible to reduce network traffic and effectively run a multiplayer game between the sharing device 250 and the first and second mobile terminals 100 and 200.

The mobile terminal according to the present invention and the operating method of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, a plurality of mobile terminals can run a multiplayer game together using a shared screen displayed on a sharing device and a personal screen on each of the screens of the mobile terminals. As a result, each player can play the multiplayer game simply by touching and dragging on his or her personal screen while viewing the shared screen, which is generally larger than the personal screen. Therefore, it is possible to maximize user convenience and satisfaction.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An operating method of a mobile terminal, the operating method comprising:
    connecting communicably to a sharing device and at least one other mobile terminal in response to selection of a multi-game mode;
    transmitting first data to the sharing device so as to display a shared screen on the sharing device;
    displaying a first personal screen on a display module of the mobile terminal, and transmitting second data to the at least one other mobile terminal so as to display a second personal screen on a display module of the at least one other mobile terminal, each of the first and second personal screens including a graphic object of a multiplayer game;
    receiving identification information of a graphic object from the at least one other mobile terminal in accordance with a user input detected from the graphic object of the second personal screen, and transmitting the identification information to the sharing device so as to display an image corresponding to the received identification information on the shared screen; and
    running the multiplayer game together with the at least one other mobile terminal by exchanging data with the at least one other mobile terminal,
    wherein the mobile terminal is directly connected to the sharing device, and
    wherein the sharing device does not communicate with the at least one other mobile terminal.

2. The operating method of claim 1, wherein the user input includes a flick input, a touch and-drag input and a movement of a main body of the at least one other mobile terminal.

3. The operating method of claim 1, further comprising changing how to display the graphic object on the sharing device in accordance with characteristics information included in the identification information of the graphic object.

4. The operating method of claim 1, further comprising generating a screen effect or a haptic effect in the sharing device in accordance with characteristics information included in the identification information of the graphic object.

5. The operating method of claim 1, further comprising deleting the graphic object from the first personal screen.

6. The operating method of claim 1, further comprising transmitting a haptic code to the at least one other mobile terminal so as to generate a haptic effect corresponding to the haptic code in the at least one other mobile terminal.

7. The operating method of claim 1, further comprising, if necessary, transmitting a predefined code corresponding to image data, instead of the image data itself, to the sharing device.

8. The operating method of claim 1, further comprising, if a communication event occurs, displaying information indicating the occurrence of the communication event.

9. The operating method of claim 1, further comprising transmitting identification information of the graphic object to the sharing device in accordance with a user input detected from the graphic object of the first personal screen so as to display an image corresponding to the identification information on the sharing device.

10. The operating method of claim 1, wherein the mobile terminal has a main program for providing the multiplayer game.

11. The operating method of claim 1, wherein the sharing device is under the control of the mobile terminal.

12. The operating method of claim 1, wherein the sharing device comprises at least one of a TV and a PC.

13. A mobile terminal comprising:
a wireless communication unit configured to connect communicably to a sharing device and at least one other mobile terminal;
a display module configured to display a first personal screen;
a memory configured to store programs for providing a multiplayer game; and
a controller configured to:
transmit first data to the sharing device so as to display a shared screen on the sharing device;
transmit second data to the at least one other mobile terminal so as to display a second personal screen on a display module of the at least one other mobile terminal, each of the first and second personal screens including a graphic object of the multiplayer game;
receive identification information of a graphic object from the at least one other mobile terminal in accordance with a user input detected from the graphic object of the second personal screen, and transmit the identification information to the sharing device so as to display an image corresponding to the received identification information on the shared screen;
run the multiplayer game together with the at least one other mobile terminal by exchanging data with the at least one other mobile terminal,
wherein the mobile terminal is directly connected to the sharing device, and
wherein the sharing device does not communicate with the at least one other mobile terminal.

14. The host mobile terminal of claim 13, further comprising a haptic module configured to generate a haptic effect.

15. The mobile terminal of claim 13, wherein the controller is configured to transmit identification information of the graphic object to the sharing device in accordance with a user input detected from the graphic object of the first personal screen so as to display an image corresponding to the identification information on the sharing device.

16. The mobile terminal of claim 13, wherein the mobile terminal has a main program for providing the multiplayer game.

17. The mobile terminal of claim 13, wherein the sharing device is under the control of the mobile terminal.

18. The mobile terminal of claim 13, wherein the sharing device comprises at least one of a TV and a PC.

19. An operating method of a mobile terminal, the operating method comprising:
connecting the mobile terminal to a sharing device and at least one other mobile terminal so as to be able to communicate with the sharing device and the at least one other mobile terminal;
transmitting a program for controlling a multiplayer game to the at least one other mobile terminal;
transmitting first data to the sharing device so as to display a shared screen on the sharing device;
displaying a first personal screen on a display module of the mobile terminal, and transmitting second data to the at least one other mobile terminal so as to display a second personal screen on a display module of the at least one other mobile terminal, each of the first and second personal screens including a graphic object of the multiplayer game;
receiving identification information of a graphic object from the at least one other mobile terminal in accordance with a user input detected from the graphic object of the second personal screen, and transmitting the identification information to the sharing device so as to display an image corresponding to the received identification information on the shared screen; and
running the multiplayer game together with the at least one other mobile terminal by exchanging data with the at least one other mobile terminal,
wherein the mobile terminal is directly connected to the sharing device, and
wherein the sharing device does not communicate with the at least one other mobile terminal.

20. The operating method of claim 19, further comprising transmitting a haptic code for generating a haptic or screen effect to the at least one other mobile terminal.

21. The operating method of claim 19, further comprising receiving data from the at least one other mobile terminal and displaying an image corresponding to the received data on the shared screen.

22. A mobile terminal comprising:
a wireless communication unit configured to connect the mobile terminal to a sharing device and at least one other mobile terminal so as to be able to communicate with the sharing device and the at least one other mobile terminal;
a display module configured to display a first personal screen; and
a controller configured to:
transmit a program for controlling a multiplayer game to the at least one other mobile terminal;
transmit first data to the sharing device so as to display a shared screen on the sharing device;
transmit second data to the at least one other mobile terminal so as to display a second personal screen on a display module of the at least one other mobile terminal, each of the first and second personal screens including a graphic object of the multiplayer game;

receive identification information of a graphic object from the at least one other mobile terminal in accordance with a user input detected from the graphic object of the second personal screen, and transmit the identification information to the sharing device so as to display an image corresponding to the received identification information on the shared screen; and run the multiplayer game together with the at least one other mobile terminal by exchanging data with the at least one other mobile terminal, wherein the mobile terminal is directly connected to the sharing device, and wherein the sharing device does not communicate with the at least one other mobile terminal.

* * * * *